(12) United States Patent
Kordel et al.

(10) Patent No.: US 8,733,692 B2
(45) Date of Patent: May 27, 2014

(54) LATCHING APPARATUS AND METHODS

(75) Inventors: Jan A. Kordel, Redmond, WA (US);
Mark S. Good, Seattle, WA (US)

(73) Assignee: The Boeing Company, Chicago, IL (US)

( * ) Notice: Subject to any disclaimer, the term of this patent is extended or adjusted under 35 U.S.C. 154(b) by 89 days.

(21) Appl. No.: 13/493,688

(22) Filed: Jun. 11, 2012

(65) Prior Publication Data

US 2013/0327883 A1   Dec. 12, 2013

(51) Int. Cl.
*B64C 3/56* (2006.01)

(52) U.S. Cl.
USPC ............................ 244/49; 74/483 R; 292/335

(58) Field of Classification Search
USPC .......... 244/49, 102 SL, 3.27, 3.28, 131, 99.2, 244/3.24, 120; 74/477, 83 R, 483 K, 485, 74/813 R, 665, 89.15, 661, 479, 424.8 R; 292/335, 144, 302; 92/14, 16, 20, 23, 92/24, 29
See application file for complete search history.

(56) References Cited

U.S. PATENT DOCUMENTS

| | | | |
|---|---|---|---|
| 2,289,224 A * | 7/1942 | Anderson et al. | 244/49 |
| 2,719,682 A * | 10/1955 | Handel | 244/49 |
| 4,497,461 A * | 2/1985 | Campbell | 244/99.3 |
| 5,040,747 A * | 8/1991 | Kane et al. | 244/102 R |
| 5,229,921 A * | 7/1993 | Bohmer | 361/679.27 |
| 5,288,037 A * | 2/1994 | Derrien | 244/102 SL |
| 5,310,138 A * | 5/1994 | Fitzgibbon | 244/49 |
| 5,379,969 A * | 1/1995 | Marx et al. | 244/49 |
| 5,381,986 A * | 1/1995 | Smith et al. | 244/49 |
| 5,427,329 A * | 6/1995 | Renzelmann et al. | 244/49 |
| 5,558,299 A * | 9/1996 | Veile | 244/49 |
| 6,260,798 B1 * | 7/2001 | Casiez et al. | 244/49 |
| 7,600,297 B2 * | 10/2009 | Gitnes | 16/358 |
| 2007/0018033 A1 * | 1/2007 | Fanucci et al. | 244/3.27 |
| 2007/0152098 A1 * | 7/2007 | Sheahan et al. | 244/49 |
| 2008/0087763 A1 * | 4/2008 | Sheahan et al. | 244/49 |
| 2013/0099060 A1 * | 4/2013 | Dees et al. | 244/199.4 |
| 2013/0206897 A1 * | 8/2013 | Rastegar et al. | 244/3.24 |
| 2013/0327883 A1 * | 12/2013 | Kordel et al. | 244/49 |

* cited by examiner

*Primary Examiner* — Christopher P Ellis
*Assistant Examiner* — Medhat Badawi
(74) *Attorney, Agent, or Firm* — Hanley, Flight & Zimmerman, LLC

(57) ABSTRACT

Latching apparatus and methods are disclosed herein. An example apparatus includes a first latch portion including a first tooth and a first pin disposed in a first aperture defined by the first tooth and a second latch portion including a second tooth and a second pin disposed in an second aperture defined by the second tooth. The second tooth of the second latch portion is to mesh with the first tooth of the first latch portion to substantially orient the first pin and the second pin along an axis. The example apparatus further includes an actuator adjacent a first end of one of the first latch portion or the second latch portion to move the first pin and the second pin along the axis to lock the first latch portion to the second latch portion.

8 Claims, 8 Drawing Sheets

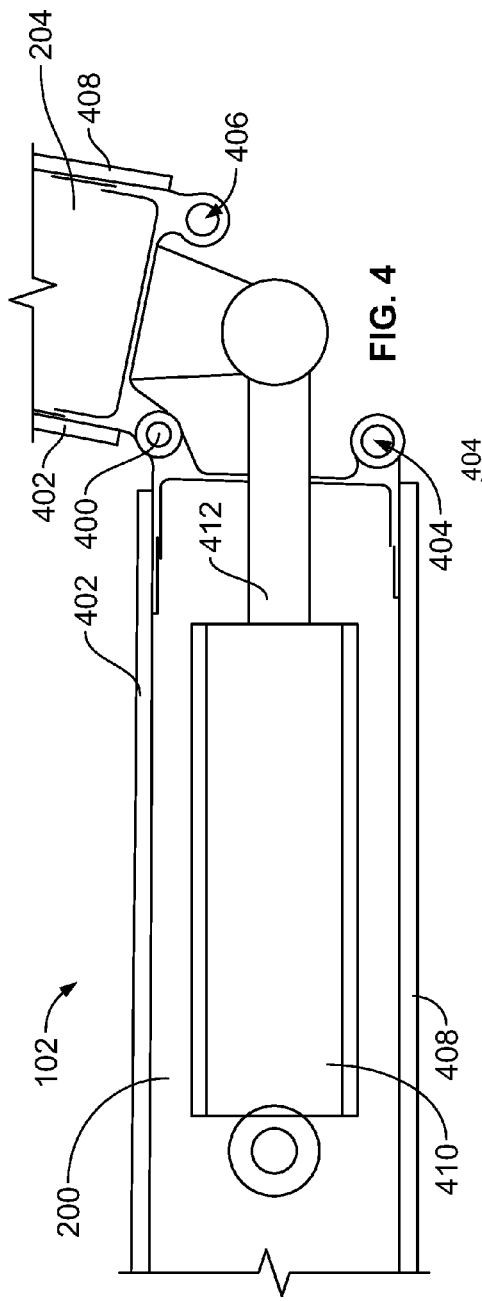
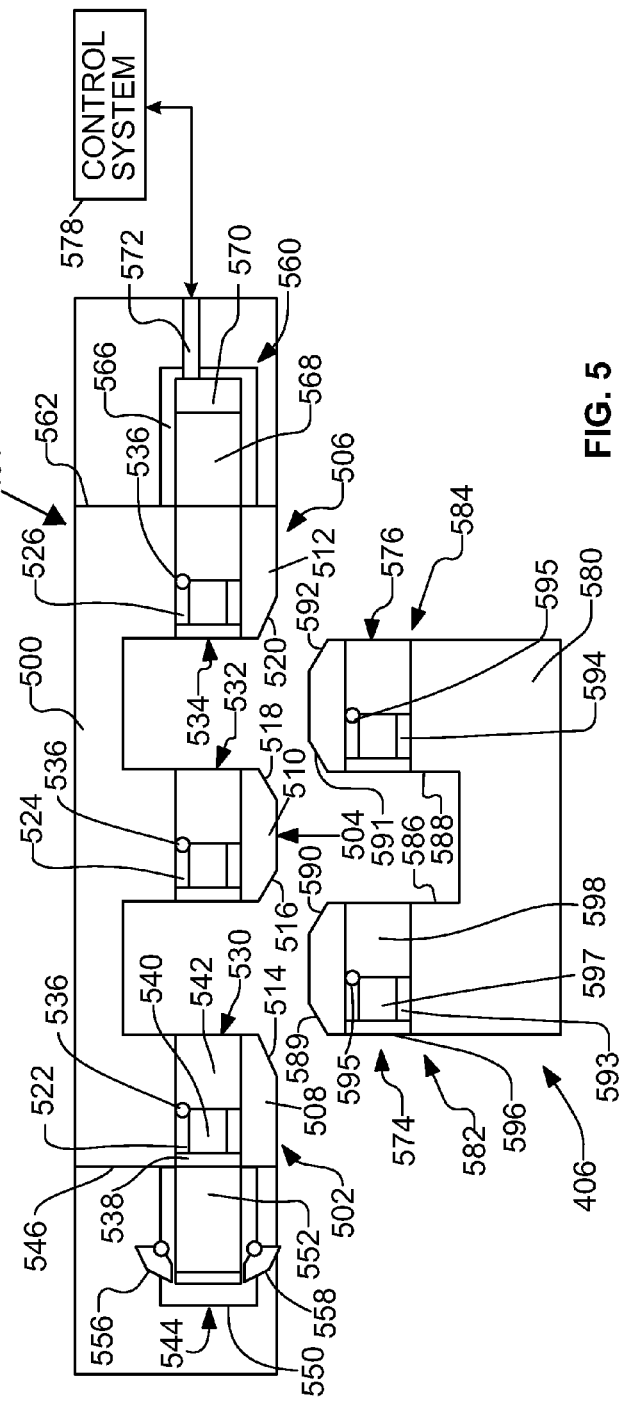
FIG. 4
FIG. 5

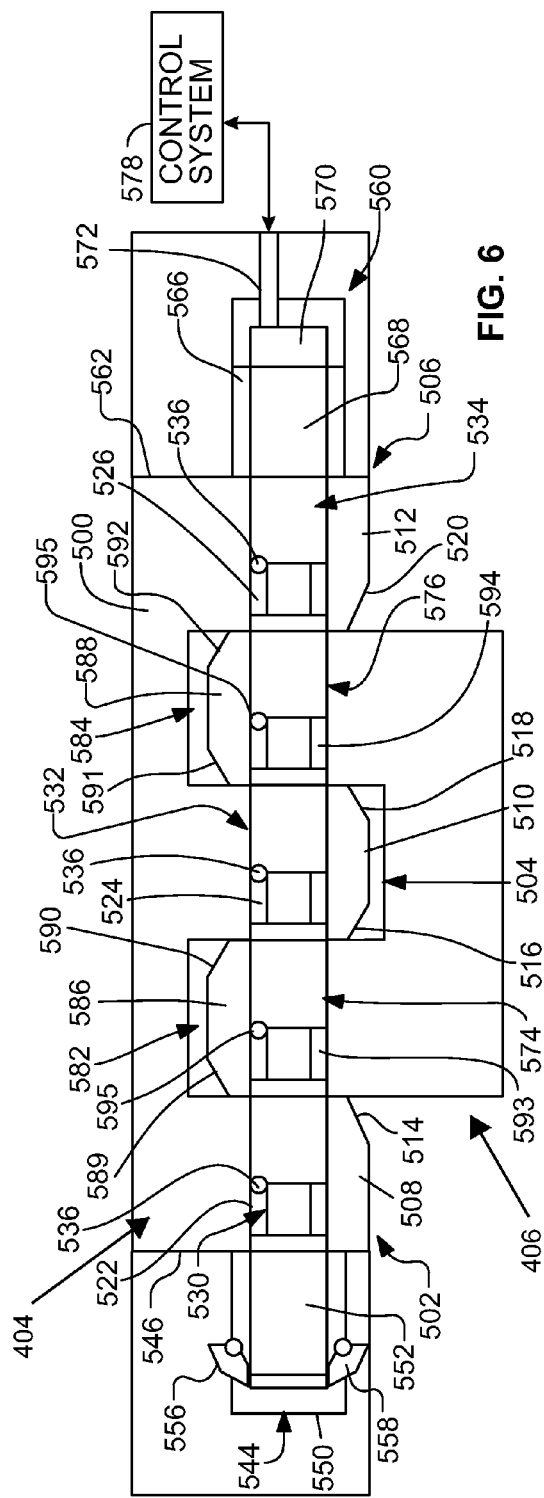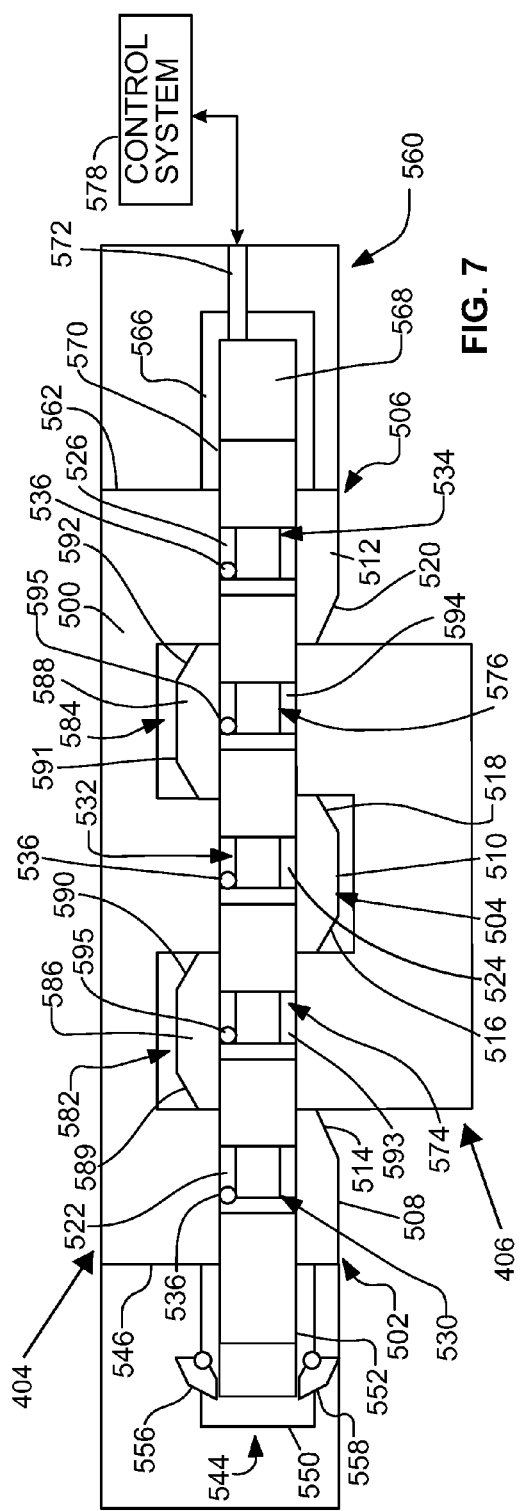

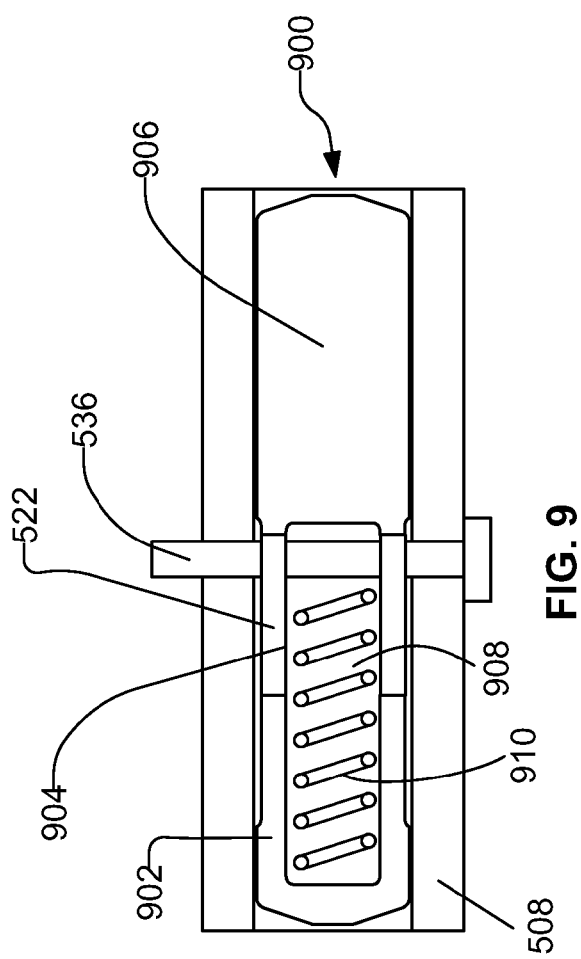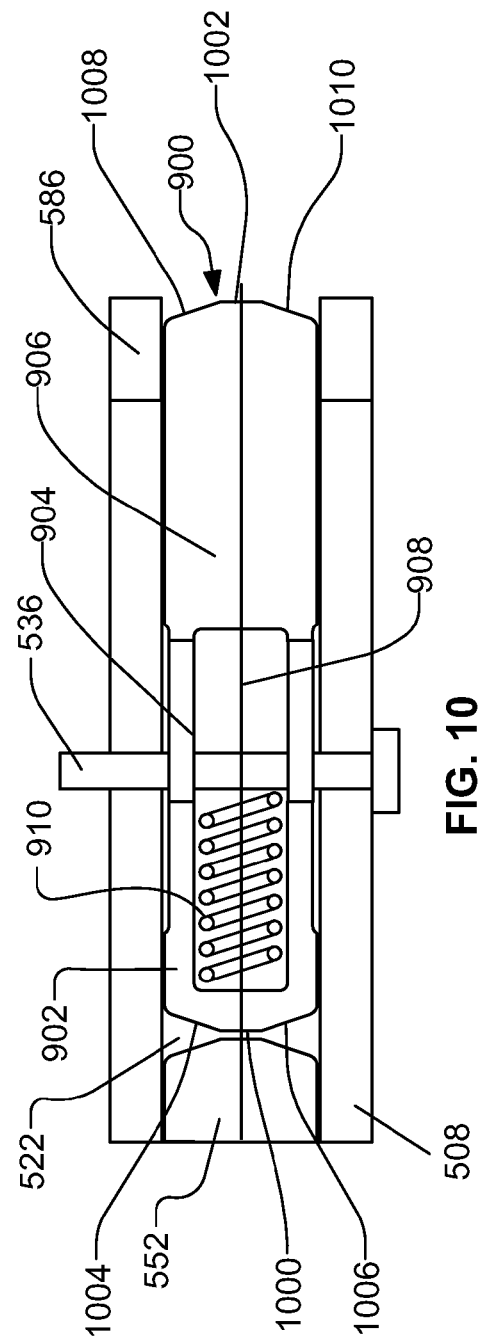

US 8,733,692 B2

LATCHING APPARATUS AND METHODS

FIELD

The present disclosure relates generally to latches and, more particularly, to latching apparatus and methods.

BACKGROUND

An airport taxiway and/or gate may have space (e.g., width) limitations, which limit a wingspan of an aircraft that may use the taxiway and/or the gate. However, the wingspan of the aircraft may correspond to a maximum possible passenger volume and/or cargo volume of the aircraft. Thus, to service a greater number of passengers, decrease fuel consumption and/or transport a larger amount of cargo, employment of an aircraft with a wingspan exceeding the space limitation of the taxiway and/or the gate may be desirable. To employ an aircraft having a wingspan greater than the space limitation of a taxiway and/or a gate, the wings of the aircraft may fold to enable the aircraft to fit within the taxiway and/or the gate.

SUMMARY

An example apparatus includes a first latch portion including a first tooth and a first pin disposed in a first aperture defined by the first tooth and a second latch portion including a second tooth and a second pin disposed in a second aperture defined by the second tooth. The second tooth of the second latch portion is to mesh with the first tooth of the first latch portion to substantially orient the first pin and the second pin along an axis. The example apparatus further includes an actuator adjacent a first end of one of the first latch portion or the second latch portion to move the first pin and the second pin along the axis to lock the first latch portion to the second latch portion.

Another example apparatus includes a wing of an aircraft including a first portion and a second portion. The second portion is to move between a folded position and a spread position. The example apparatus further includes a first catch disposed on the first portion of the wing and a second catch disposed on the second portion of the wing. When the second portion of the wing is in the spread position, the first catch is adjacent the second catch. The example apparatus also includes a plurality of locking bars. A first one of the locking bars is disposed in the first catch, and a second one of the locking bars is disposed in the second catch. The example apparatus further includes an actuator operatively coupled to a third one of the locking bars. The actuator is to move the third one of the locking bars when the second portion of the wing is in the spread position to cause at least two of the locking bars to be disposed in each of the first catch and the second catch to lock the second portion of the wing in the spread position.

An example method includes engaging a first latch portion disposed on a first portion of a wing of an aircraft and a second latch portion disposed on a second portion of the wing. The first latch portion includes a first catch and a first locking bar disposed in the first catch. The second latch portion includes a second catch and a second locking bar disposed in the second catch. The example method also includes actuating an actuator to move a third locking bar from a first position to a second position. The third locking bar is operatively coupled to one of the first locking bar or the second locking bar. The example method further includes determining if the first locking bar and the second locking bar have moved from the first position to the second position to lock the first latch portion into engagement with the second latch portion.

The features, functions and advantages that have been discussed can be achieved independently in various examples or may be combined in yet other examples further details of which can be seen with reference to the following description and drawings.

BRIEF DESCRIPTION OF THE DRAWINGS

FIG. 4 illustrates a part of one of the wings of the example aircraft of FIG. 3 including an example apparatus disclosed herein.

FIG. 5 further illustrates the example apparatus of FIG. 4, which may be used to lock one of the wings of the example aircraft of FIG. 1 in the spread position.

FIG. 6 illustrates a first latch portion and a second latch portion of the example apparatus of FIG. 5 in engagement.

FIG. 7 illustrates the first latch portion and the second latch portion of the example apparatus of FIG. 6 locked into engagement.

FIG. 9 illustrates an example locking bar disclosed herein in an unlocked position.

FIG. 10 illustrates the example locking bar of FIG. 9 in a locked position.

Figure 1:
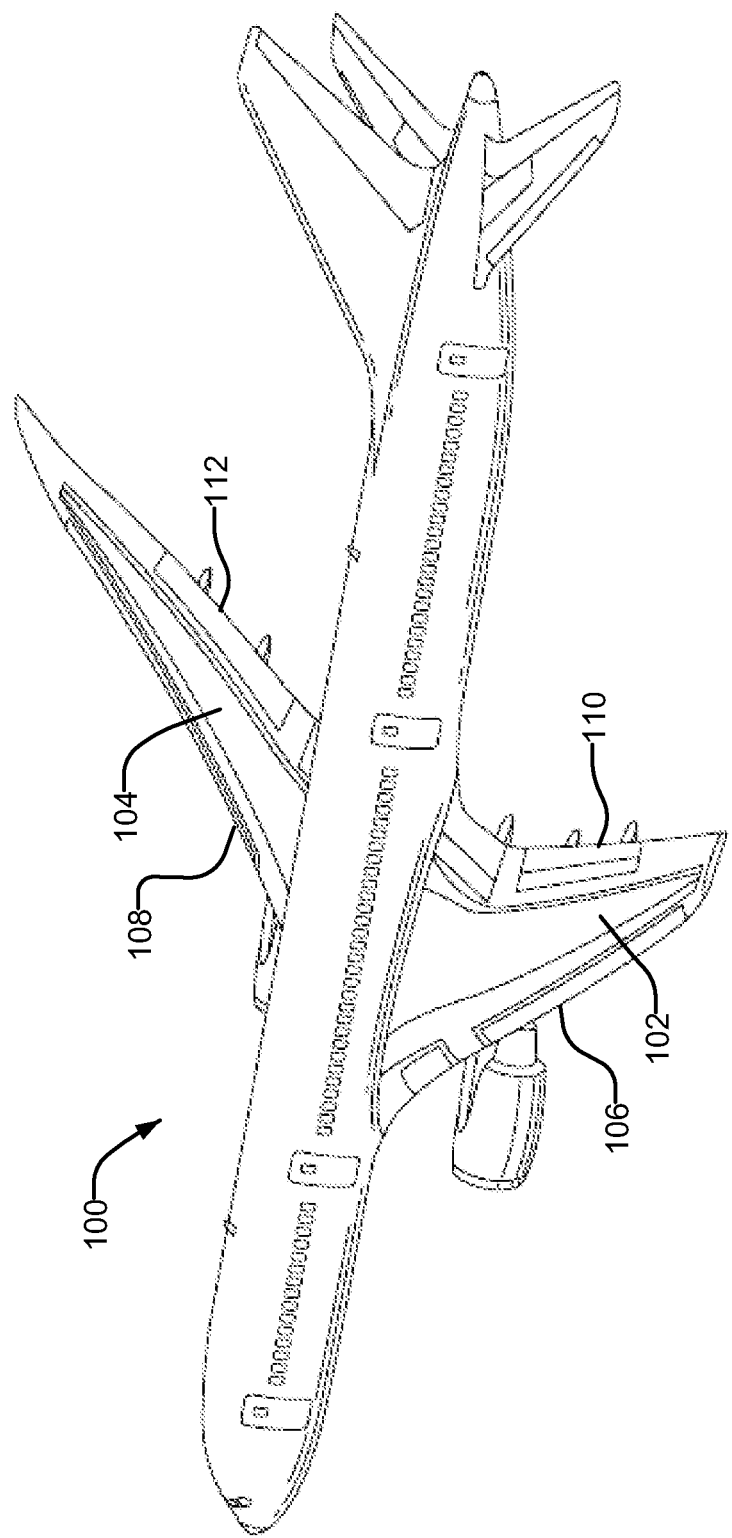
FIG. 1 illustrates an example aircraft that may be used to implement the examples disclosed herein.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

FIG. 1 is a perspective view of an example aircraft 100 in which aspects of the present disclosure may be implemented. The example aircraft 100 of FIG. 1 includes a first wing 102 and a second wing 104. The first wing 102 and the second wing 104 each include a leading edge 106 and 108 and a trailing edge 110 and 112.

Figure 2:
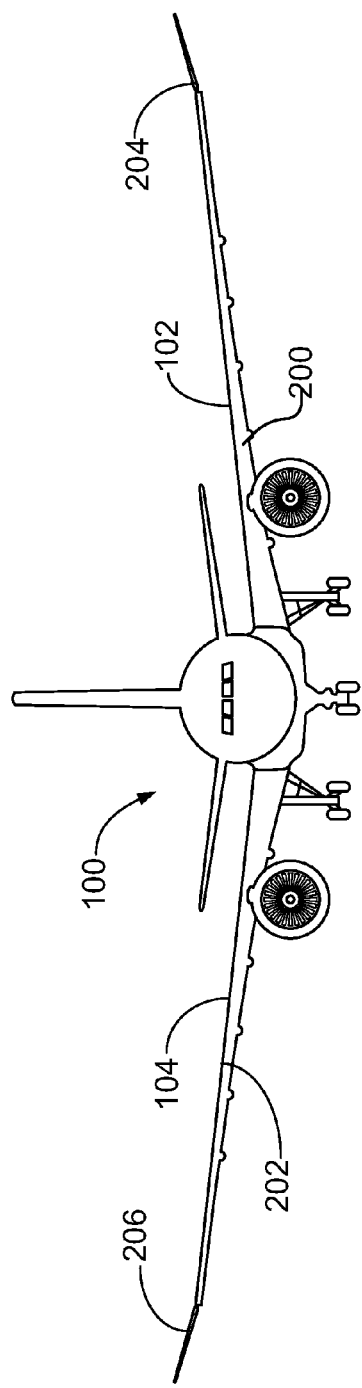
FIG. 2 illustrates the wings of the example aircraft of FIG. 1 in a spread position.

FIG. 2 is a front view of the example aircraft 100 of FIG. 1. The first wing 102 and the second wing 104 each include a first portion 200 and 202 (i.e., an inboard portion) and a second portion 204 and 206 (i.e., a tip portion). In the illustrated example of FIG. 2, the second portion 204 of the first wing 102 and the second portion 206 of the second wing 104 are in a spread or flight position. When the second portion 204 of the first wing 102 and the second portion 206 of the second wing 104 are in the spread position, the first wing 102 and the second wing 104 each provide a substantially continuous airfoil. As described in greater detail below, the second portion 204 of the first wing 102 and/or the second portion 206 of the second wing 104 may be locked into the spread position.

Figure 3:
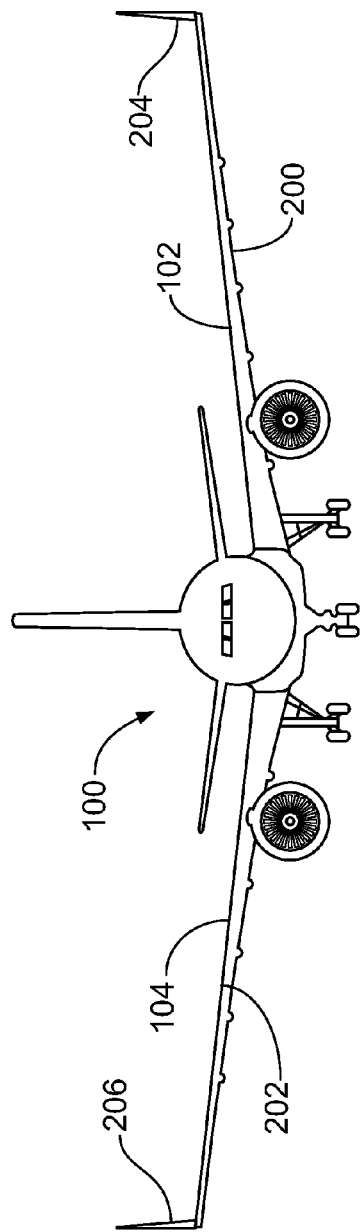
FIG. 3 illustrates portions of the wings of the example aircraft of FIG. 1 in a folded position.

FIG. 3 illustrates the example aircraft 100 of FIGS. 1 and 2 in which the second portion 204 of the first wing 102 and the second portion 206 of the second wing 104 are in a folded position. In most cases, when the second portion 204 of the first wing 102 and the second portion 206 of the second wing 104 are in the folded position, a wingspan of the aircraft 100 is less than a wingspan of the aircraft 100 when the second portion 204 of the first wing 102 and the second portion 206 of the second wing 104 are in the spread position. In the example illustrated in FIG. 3, to achieve the folded position, the second portion 204 of the first wing 102 and the second portion 206 of the second wing 104 are rotated upward relative to the first portions 200 and 202 such that the second portion 204 of the first wing 102 and the second portion 206 of the second wing 104 are oriented substantially vertically. In other examples, to achieve the folded position, the second portion 204 of the first wing 102 and the second portion 206 of the second wing 104 are rotated downward relative to the first portion 200 of the first wing 102 and the first portion 202 of the second wing 104, respectively, with the aircraft 100 viewed in the orientation of FIG. 2.

FIG. 4 is an enlarged, cross-sectional view of a part of a wing of the example aircraft, e.g., the first wing 102, illustrating the second portion 204 of the first wing 102 in the folded position. In the illustrated example, the second portion 204 of the first wing 102 is movably coupled to the first portion 200 of the first wing 102 via a joint 400 adjacent an upper wing skin 402. The example joint 400 provides an axis of rotation for the second portion 204 of the first wing 102. In the illustrated example, the axis of rotation is substantially parallel to a chord of the first wing 102. In other examples, the second portion 204 of the first wing 102 folds along other axes.

The first portion 200 of the first wing 102 includes a first latch portion 404, and the second portion 204 of the first wing 102 includes a second latch portion 406. The example first latch portion 404 and the example second latch portion 406 are adjacent a lower wing skin 408. In the illustrated example, the first latch portion 404 and the second latch portion 406 are disengaged. As described in greater detail below, when the first latch portion 404 and the second latch portion 406 are engaged, the second portion 204 of the first wing 102 may be locked into the spread position.

The example first wing 102 includes a wing actuator 410 operatively coupled to the second portion 204 of the first wing 102 to move the second portion 204 relative to the first portion 200. For example, the wing actuator 410 moves the second portion 204 of the first wing 102 from the spread position to the folded position and from the folded position to the spread position. The example wing actuator 410 is disposed within the first portion 200 of the first wing 102 between the joint 400 and the first latch portion 404. In the illustrated example, the wing actuator 410 includes an arm 412 coupled to the second portion 204 of the first wing 102. When the example wing actuator 410 is energized and the second latch portion 406 is not locked into engagement with first latch portion 404, the arm 412 of the wing actuator 410 extends to rotate the second portion 204 of the first wing 102 about the joint 400.

FIG. 5 is a cross-sectional view of the first latch portion 404 and the second latch portion 406 of FIG. 4 when the second portion 204 of the first wing 102 is in the folded position. In the illustrated example, the first latch portion 404 is disposed on the first portion 200 of the wing and the second latch portion 406 is disposed on the second portion 204 of the first wing 102. However, in other examples, the first latch portion 404 is disposed on the second portion 204 of the first wing 102 and the second latch portion 406 is disposed on the first portion 200 of the first wing 102. The example first latch portion 404 includes a first bracket or leaf 500. In the illustrated example, the first bracket 500 has a straight profile. In other examples, the first bracket 500 has a curved profile. The first bracket 500 includes a first catch 502, a second catch 504, and a third catch 506. Other examples include other numbers of catches. In the illustrated example, the first catch 502 includes a first tooth 508, the second catch 504 includes a second tooth 510 and the third catch 506 includes a third tooth 512. The example first tooth 508, the example second tooth 510 and the example third tooth 512 are spaced apart along the first bracket 500. In the illustrated example, each of the first tooth 508, the second tooth 510 and the third tooth 512 defines one or more chamfers 514, 516, 518 and 520.

In the illustrated example, the first tooth 508 defines a first aperture 522, the second tooth 510 defines a second aperture 524 and the third tooth 512 defines a third aperture 526. The first aperture 522, the second aperture 524, and the third aperture 526 extend through the width (i.e., from a left side to a right side in the orientation of FIG. 5) of the first tooth 508, the second tooth 510 and the third tooth 512, respectively. In the illustrated example, the first aperture 522, the second aperture 524 and the third aperture 526 are substantially parallel and disposed along a first axis. Thus, the example first aperture 522, the example second aperture 524 and the example third aperture 526 are substantially coaxial. In the illustrated example, the first axis is oriented substantially parallel to an axis extending from the leading edge 106 of the first wing 102 to the trailing edge 110 of the first wing 102 (e.g., a chord of the first wing 102). In other examples, the first axis is oriented along other axes (e.g., perpendicular to a spar of the first wing 102). The example first latch portion 404 includes a first locking bar 530, a second locking bar 532 and a third locking bar 534. In the illustrated example, the first locking bar 530 is disposed in the first aperture 522, the second locking bar 532 is disposed in the second aperture 524 and the third locking bar 534 is disposed in the third aperture 526. Thus, the first locking bar 530, the second locking bar 532 and the third locking bar 534 are oriented along the first axis.

The example first catch 502, the example second catch 504 and the example third catch 506 of the first latch portion 404 are substantially identical, and the first locking bar 530, the second locking bar 532 and the third locking bar 534 are substantially identical. Therefore, a description of the first catch 502 is applicable to the second catch 504 and the third catch 506, and a description of the first locking bar 530 is applicable to the second locking bar 532 and the third locking bar 534. Thus, to avoid redundancy, the second catch 504, the third catch 506, the second locking bar 532 and the third locking bar 534 are not separately described. The first catch 502 includes a first retainer 536. In the illustrated example, the first retainer 536 is a stop (e.g., a fastener, a lip, a protrusion, etc.) disposed in the first aperture 522. In the illustrated example, the first locking bar 530 is a pin. However, other examples employ other locking bars (e.g., beams, keyed shafts, etc.). The example first locking bar 530 defines a head portion 538, a neck portion 540, and a body portion 542. However, other example locking bars are other shapes. A diameter of the neck portion 540 is less than a diameter of the head portion 538 and/or the body portion 542, and the first retainer 536 is disposed in the first aperture 522 adjacent the neck portion 540. If the first locking bar 530 moves a threshold amount along the first axis relative to the first tooth 508, the head portion 538 or the body portion 542 contacts the first retainer 536, thereby restraining the movement of the first locking bar 530. Thus, the example first retainer 536 retains the first locking bar 530 within the first aperture 522 and prevents the first locking bar 530 from fully evacuating the first catch 502.

In the illustrated example, a first latch actuator 544 is disposed on the first portion 200 (see, e.g., FIG. 4) of the first wing 102 adjacent a first end 546 of the first latch portion 404. In some other examples (e.g., examples in which the first latch portion 404 is disposed on the second portion 204 of the first wing 102 and the second latch portion 406 is disposed on the first portion 200 of the first wing 102, examples in which the first latch portion 404 and the second latch portion 406 each include an even number of teeth, etc.), the first latch actuator 544 is disposed on the second portion 204 of the first wing 102. The first latch actuator 544 may be any suitable linear actuator such as for example, the actuator described in U.S. Pat. No. 5,381,986, which is hereby incorporated herein by reference in its entirety. The example first latch actuator 544 is operatively coupled to the first locking bar 530 disposed in the first catch 502 of the first latch portion 404. In the illustrated example, the first latch actuator 544 includes a housing 550 and a fourth locking bar 552 disposed in the housing 550. The example fourth locking bar 552 (e.g., a pin, a beam, a keyed shaft, etc.) is operatively coupled to the first locking bar 530 disposed in the first catch 502.

The example first latch actuator 544 includes a first lock 556 and a second lock 558. Other examples include other numbers of locks (e.g., 0, 1, 3, etc.). In the illustrated example, the first latch actuator 544 is in an unactauted state, and the first lock 556 and the second lock 558 are in an unlocked position. In some examples, when the first latch actuator 544 is in the unactuated state, the fourth locking bar 552 of the first latch actuator 544 is disposed outside of the first aperture 522 of the first catch 502. As described in greater detail below, when the first latch actuator 544 is in an actuated state (e.g., in preparation for flight, during flight, etc.), the fourth locking bar 552 of the first latch actuator 544 is disposed in the first catch 502, and the example first lock 556 and/or the example second lock 558 move to a locked position to lock the first latch actuator 544 in the actuated state.

In the illustrated example, a second latch actuator 560 is disposed on the first portion 200 (see, e.g., FIG. 4) of the first wing 102 adjacent a second end 562 of the first latch portion 404. In other examples (e.g., examples in which the first latch portion 404 is disposed on the second portion 204 of the first wing 102 and the second latch portion 406 is disposed on the first portion 200 of the first wing 102, examples in which the first latch portion 404 and the second latch portion 406 each have an even number of teeth, examples in which the first latch portion 404 and the second latch portion 406 have the same number of teeth, etc.), the second latch actuator 560 is disposed on the second portion 204 of the first wing 102. Thus, in some examples, the first latch actuator 544 and the second latch actuator 560 are disposed on the same portion of the first wing 102 and, in other examples (e.g.,), the first latch actuator 544 and the second latch actuator 560 are disposed on different portions of the first wing 102.

The second latch actuator 560 may be any suitable linear actuator such as, for example, the actuator described in U.S. Pat. No. 5,381,986. The example second latch actuator 560 is operatively coupled to the third locking bar 534 disposed in the third catch 506. In the illustrated example, the second latch actuator 560 includes a housing 566 and a fifth locking bar 568 disposed in the housing 566. The example fifth locking bar 568 of the second latch actuator 560 is operatively coupled to the third locking bar 534 disposed in the third catch 506. The example housing 566 of the second latch actuator 560 defines a fourth catch 570 (e.g., a bore, chamber, a passageway, etc.) to receive a portion of the third locking bar 534 of the third catch 506. In the illustrated example, the second latch actuator 560 is in an actuated state in which the fifth locking bar 568 of the second latch actuator 560 is adjacent the third catch 506. When the example second latch actuator 560 is in an unactuated state, the fifth locking bar 568 of the second latch actuator 560 is positioned away from the third catch 506 such that the fourth catch 570 of the second latch actuator 560 may receive a portion of the third locking bar 534 of the third catch 506.

In the illustrated example, the first portion 200 (see, e.g., FIG. 4) of the first wing 102 includes a sensor 572, which is operatively coupled to the second latch actuator 560. In some examples, the sensor 572 is a proximity sensor, which is triggered when the fifth locking bar 568, a piston, an arm, and/or any other suitable portion of the second latch actuator 560 moves a threshold distance from the third catch 506. In some examples, the sensor 572 is operatively coupled to the first locking bar 530, the second locking bar 532, the third locking bar 534 of the first latch portion 404 and/or a sixth locking bar 574 and/or a seventh locking bar 576 of the second latch portion 406. The example sensor 572 is communicatively coupled to a control system 578, which monitors information (e.g., a position of the fifth locking bar 568, a state of the second latch actuator 560, etc.) generated via the sensor 572. In some examples, based on the information generated by the sensor 572, the example control system 578 generates, transmits, and/or displays a notification and/or an alarm (e.g., via a cockpit display). In some examples, the control system 578 transmits and/or displays the notification if the second portion 204 of the first wing 102 is in the folded position or the spread position, if the second portion 204 of the first wing 102 is locked in the spread position, if the second portion 204 of the first wing 102 is in the spread position but not locked in the spread position, etc.

In the illustrated example, second portion 204 of the first wing 102 is in the folded position and, thus, the first latch portion 404 and the second latch portion 406 are disengaged. The example second latch portion 406 includes a second bracket or leaf 580. In the illustrated example, the second bracket 580 has a straight profile. In other examples, the second bracket 580 has a curved profile. In the illustrated example, the second bracket 580 includes a fifth catch 582 and a sixth catch 584. Other examples include other numbers of catches. In the illustrated example, the fifth catch 582 includes a fourth tooth 586 and the sixth catch 584 includes a fifth tooth 588. The fourth tooth 586 is spaced apart from the fifth tooth 588 along the second bracket 580. In the illustrated example, each of the fourth tooth 586 and the fifth tooth 588 defines one or more chamfers 589, 590, 591 and 592.

In the illustrated example, the fourth tooth 586 defines a fourth aperture 593 and the fifth tooth 588 defines a fifth aperture 594. The fourth aperture 593 and the fifth aperture 594 extend through a width (i.e., from a left side to a right side in the orientation of FIG. 5) of the fourth tooth 586 and the fifth tooth 588, respectively. In the illustrated example, the fourth aperture 593 and the fifth aperture 594 are substantially parallel and disposed along a second axis. Thus, the example fourth aperture 593 and the example fifth aperture 594 are substantially coaxial. In the illustrated example, the second axis is oriented substantially parallel to the first axis. The example second latch portion 406 includes the sixth locking bar 574 and the seventh locking bar 576. In the illustrated example, the sixth locking bar 574 is disposed in the fourth aperture 593 and the seventh locking bar 576 is disposed in the fifth aperture 594. Thus, the sixth locking bar 574 and the seventh locking bar 576 are oriented along the second axis.

The example fifth catch 582 and the example sixth catch 584 are substantially identical, and the sixth locking bar 574 and the seventh locking bar 576 are substantially identical. Therefore, a description of the fifth catch 582 is applicable to the sixth catch 584, and a description of the sixth locking bar 574 is applicable to the seventh locking bar 576. Thus, to avoid redundancy, the sixth catch 584 and the seventh locking bar 576 are not separately described. The example fifth catch bar 582 includes a second retainer 595. In the illustrated example, the second retainer 595 is a stop (e.g., a fastener, a lip, a protrusion, etc.) disposed in the fourth aperture 593 of the fourth tooth 586, and the example sixth locking bar 574 is a pin. However, other examples employ other locking bars (e.g., beams, keyed shafts, etc.). The example sixth locking bar 574 defines a head portion 596, a neck portion 597, and a body portion 598. However, other example locking bars are other shapes. A diameter of the neck portion 597 is less than a diameter of the head portion 596 and/or the body portion 598, and the second retainer 595 is disposed in the fourth aperture 593 adjacent the neck portion 597. If the sixth locking bar 574 moves a threshold amount relative to the fourth tooth 586 along the second axis, the head portion 596 or the body portion 598 contacts the second retainer 595, thereby restraining the movement of the sixth locking bar 574. Thus, the example second retainer 595 retains the sixth locking bar 574 within the fourth aperture 593 and prevents the sixth locking bar 574 from fully evacuating the fourth tooth 586.

FIG. 6 illustrates the first latch portion 404 in engagement with the second latch portion 406. In the illustrated example, the second portion 204 (see, e.g., FIG. 4) of the first wing 102 is in the spread position. The example fourth tooth 586 of the second latch portion 406 is disposed adjacent the first tooth 508 and the second tooth 510 of the first latch portion 404 in a space defined between the first tooth 508 and the second tooth 510; the fifth tooth 588 of the second latch portion 406 is disposed adjacent the second tooth 510 and the third tooth 512 of the first latch portion 404 in a space defined between the second tooth 510 and the third tooth 512. Thus, the example first tooth 508, the example second tooth 510 and the example third tooth 512 of the first latch portion 404 are meshed with the example fourth tooth 586 and the example fifth tooth 588 of the second latch portion 406. When the second latch portion 406 moves into engagement with the first latch portion 404, the chamfers 589, 590, 591, and 592 of the second latch portion 406 urge any of the first locking bar 530, the second locking bar 532 and the third locking bar 534 extending outside the first tooth 508, the second tooth 510 or the third tooth 512 into the first aperture 522, the second aperture 524, or the third aperture 526, respectively. The chamfers 514, 516, 518, and 520 of the first latch portion 404 urge any of the sixth locking bar 574 and the seventh locking bar 576 extending outside of the fourth aperture 593 and the fifth aperture 594 into the fourth aperture 593 and the fifth aperture 594, respectively.

When the example first latch portion 404 and the example second latch portion 406 are engaged, the sixth locking bar 574 and the seventh locking bar 576 of the second latch portion 406 are oriented along the first axis. Thus, the first locking bar 530, the second locking bar 532 and the third locking bar 534 of the first latch portion 404 and the sixth locking bar 574 and the seventh locking bar 576 of the second latch portion 406 are substantially coaxial when the second portion 204 of the first wing 102 is in the spread position. In the illustrated example, the first latch actuator 544 is in the unactuated state, and the second latch actuator 560 is in the actuated state. As a result, the first locking bar 530, the second locking bar 532, the third locking bar 534, the sixth locking bar 574 and the seventh locking bar 576 are in a first position where only one of the first locking bar 530, the second locking bar 532, the third locking bar 534, the sixth locking bar 574 and the seventh locking bar 576 is disposed in each one of the first tooth 508, the second tooth 510, the third tooth 512, the fourth tooth 586, and the fifth tooth 588. Thus, the first locking bar 530, the second locking bar 532, the third locking bar 534, the sixth locking bar 574 and the seventh locking bar 576 do not interfere with movement of the second latch portion 406 relative to the first latch portion 404. As a result, the second latch portion 406 is not locked into engagement with the first latch portion 404, and the wing actuator 410 (FIG. 10) is free to move the second portion 204 of the first wing 102 from the spread position to the folded position.

FIG. 7 illustrates the example first latch portion 404 and the example second latch portion 406 when the second portion 204 (see, e.g., FIG. 4) of the first wing 102 is locked in the spread position. In some examples, the example second latch actuator 560 is continuously energized and the first latch actuator 544 is selectively energized during operation of the example aircraft 100. In some examples, when the first latch actuator 544 is energized, the first latch actuator 544 provides a greater driving force than a driving force provided by the second latch actuator 560. In some examples in which the first latch actuator 544 and the second latch actuator 560 are hydraulic actuators, a piston face area of the second latch actuator 560 is less than a piston face area of the first latch actuator 544. In some such examples, the first latch actuator 544 and the second latch actuator 560 are energized via about the same hydraulic pressure (e.g., 3000 pounds per square inch) and, thus, the first latch actuator 544 provides a greater driving force to the first locking bar 530 disposed in the first catch 502 than the driving force provided by the second latch actuator 560 to the third locking bar 534 disposed in the third catch 506. As a result, the first latch actuator 544 moves the first locking bar 530, the second locking bar 532, the third locking bar 534, the fourth locking bar 552, the sixth locking bar 574 and the seventh locking bar 576 along the first axis toward the second latch actuator 560 and back-drives the fifth locking bar 568 of the second latch actuator 560.

In the illustrated example, the first latch actuator 544 has moved a portion of the fourth locking bar 552 of the first latch actuator 544 into the first aperture 522 of the first catch 502 to move the first locking bar 530, the second locking bar 532, the third locking bar 534, the fifth locking bar 568, the sixth locking bar 574 and the seventh locking bar 576 along the first axis to a second position. In some examples, when the example first latch actuator 544 moves the first locking bar 530, the second locking bar 532, the third locking bar 534, the fourth locking bar 552, the fifth locking bar 568, the sixth locking bar 574 and the seventh locking bar 576 from the first position to the second position, the first locking bar 530, the second locking bar 532, the third locking bar 534, the fourth locking bar 552, the fifth locking bar 568, the sixth locking bar 574 and the seventh locking bar 576 move less than a distance corresponding to the width of any one of the first tooth 508, the second tooth 510, the third tooth 512, the fourth tooth 586 and the fifth tooth 588. As a result, in the illustrated example, two of the first locking bar 530, the second locking bar 532, the third locking bar 534, the fourth locking bar 552, the fifth locking bar 568, the sixth locking bar 574 and the seventh locking bar 576 are disposed in each one of the first catch 502, the second catch 504, the third catch 506, the fourth catch 570, the fifth catch 582 and the sixth catch 584.

Thus, when the first latch actuator 544 moves the first locking bar 530, the second locking bar 532, the third locking bar 534, the fourth locking bar 552, the fifth locking bar 568, the sixth locking bar 574 and the seventh locking bar 576 to the second position, the first locking bar 530, the second locking bar 532, the third locking bar 534, the sixth locking bar 574 and the seventh locking bar 576 substantially prevent movement of the second latch portion 406 relative to the first latch portion 404. As a result, the second portion 204 (see, e.g., FIG. 4) of the first wing 102 is locked in the spread position.

In the illustrated example, the sensor 572 and/or the control system 578 determines if the second portion 204 of the first wing 102 is locked in the spread position based on the state (e.g., the actuated state or the unactuated state) of the second latch actuator 560 and/or based on a position of one or more of the first locking bar 530, the second locking bar 532, the third locking bar 534, the fourth locking bar 552, the fifth locking bar 568, the sixth locking bar 574 and the seventh locking bar 576. In some examples, to determine the state of the second latch actuator 560, the sensor 572 detects a position of the fifth locking bar 568 of the second latch actuator 560.

In the illustrated example, the first lock 556 and the second lock 558 of the first latch actuator 544 are in an unlocked position. Thus, if the first latch actuator 544 is de-energized, the example second latch actuator 560 moves the first locking bar 530, the second locking bar 532, the third locking bar 534, the fourth locking bar 552, the fifth locking bar 568, the sixth locking bar 574 and the seventh locking bar 576 to the first position and unlocks the second latch portion 406 from engagement with the first latch portion 404.

Figure 8:
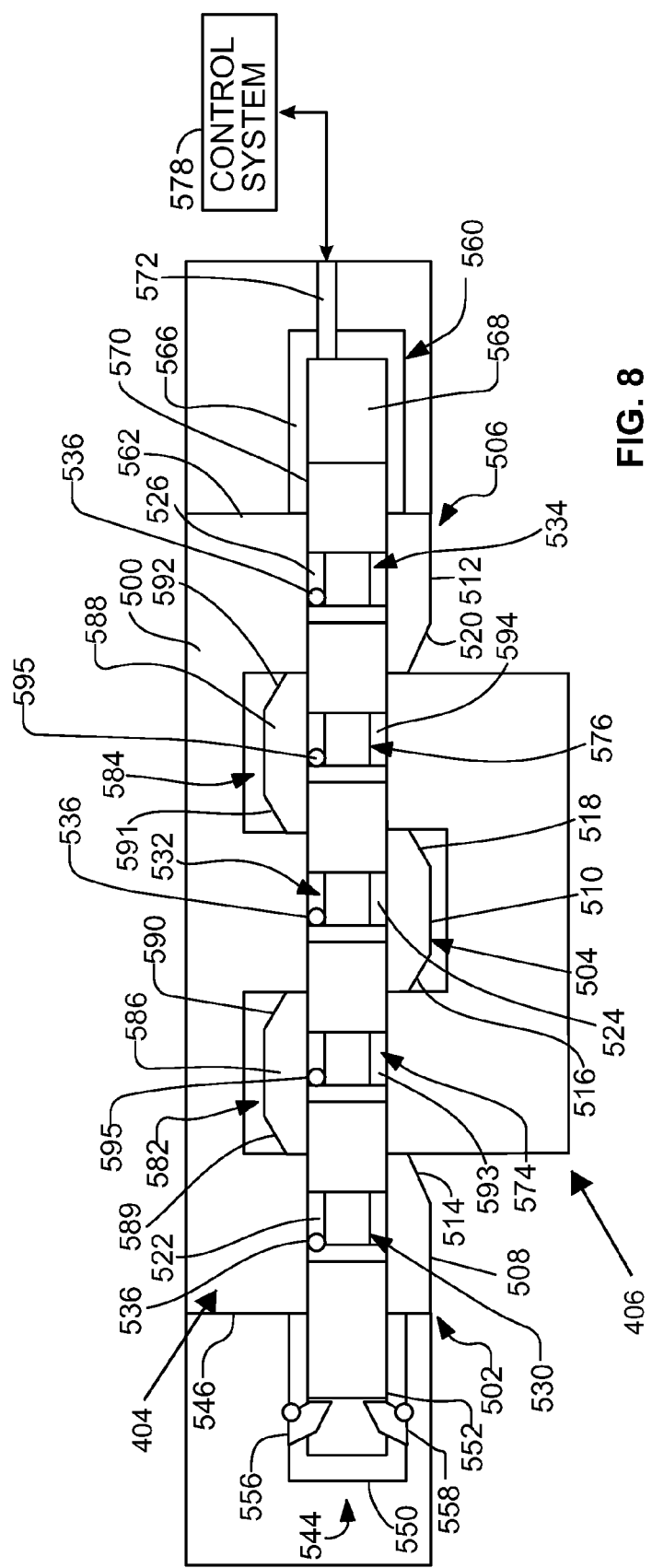
FIG. 8 illustrates a first latch actuator of the example apparatus of FIG. 7 locked in an actuated state.

FIG. 8 illustrates the example first latch actuator 544 locked in the actuated state. In the illustrated example, the first latch actuator 544 is in an actuated state, and the first lock 556 and the second lock 558 are in a locked position. As a result, the first lock 556 and/or the second lock 558 lock the first latch actuator 544 in the actuated state. If the example first latch actuator 544 of FIG. 8 is de-energized, the first lock 556 and/or the second lock 558 holds the first latch actuator 544 in the actuated state, and the first latch portion 404 and the second latch portion 406 remain locked into engagement.

FIG. 9 illustrates another example locking bar 900 disclosed herein, which may be used to implement the example first latch portion 404 and/or the example second latch portion 406 of FIGS. 4-8. In the illustrated example, the locking bar 900 is in the first position and, thus, the example locking bar 900 is disposed only in the first tooth 508. The example locking bar 900 includes a head portion 902, a neck portion 904, and a body portion 906. In the illustrated example, the neck portion 904 and the head portion 902 define a chamber 908. A spring 910 is disposed in the chamber 908 and coupled to the head portion 902 and the first retainer 536. When the locking bar 900 is in the first position, the spring 910 is substantially not energized (i.e., compressed or extended). Thus, if the locking bar 900 moves from the first position, the spring 910 urges the locking bar 900 toward the first position. As a result, the spring 910 substantially maintains the locking bar 900 in the first position unless the first latch actuator 544 (see, e.g., FIG. 5) moves the locking bar 900.

FIG. 10 illustrates the example locking bar 900 of FIG. 9 in the second position. In the illustrated example, the fourth locking bar 552 of the first latch actuator 544 has moved the example locking bar 900 along the first axis relative to the first tooth 508. As a result, the locking bar 900 has moved such that the locking bar 900 is disposed in both the first tooth 508 and the fourth tooth 586, and the spring 910 is compressed between the head portion 902 of the locking bar 900 and the first retainer 536. Thus, spring 910 biases the locking bar 900 toward the first position.

In the illustrated example, each end 1000 and 1002 of the locking bar 900 defines one or more chamfers 1004, 1006, 1008 and 1010. In some examples, the ends 1000 and 1002 of the locking bar 900 are tapered. In the illustrated example, the diameter of the example locking bar 900 is about one quarter of the length of the locking bar 900. However, the above-noted shapes and dimensions are merely examples and, thus, other shapes and dimensions may be used without departing from the scope of this disclosure.

Figure 11:
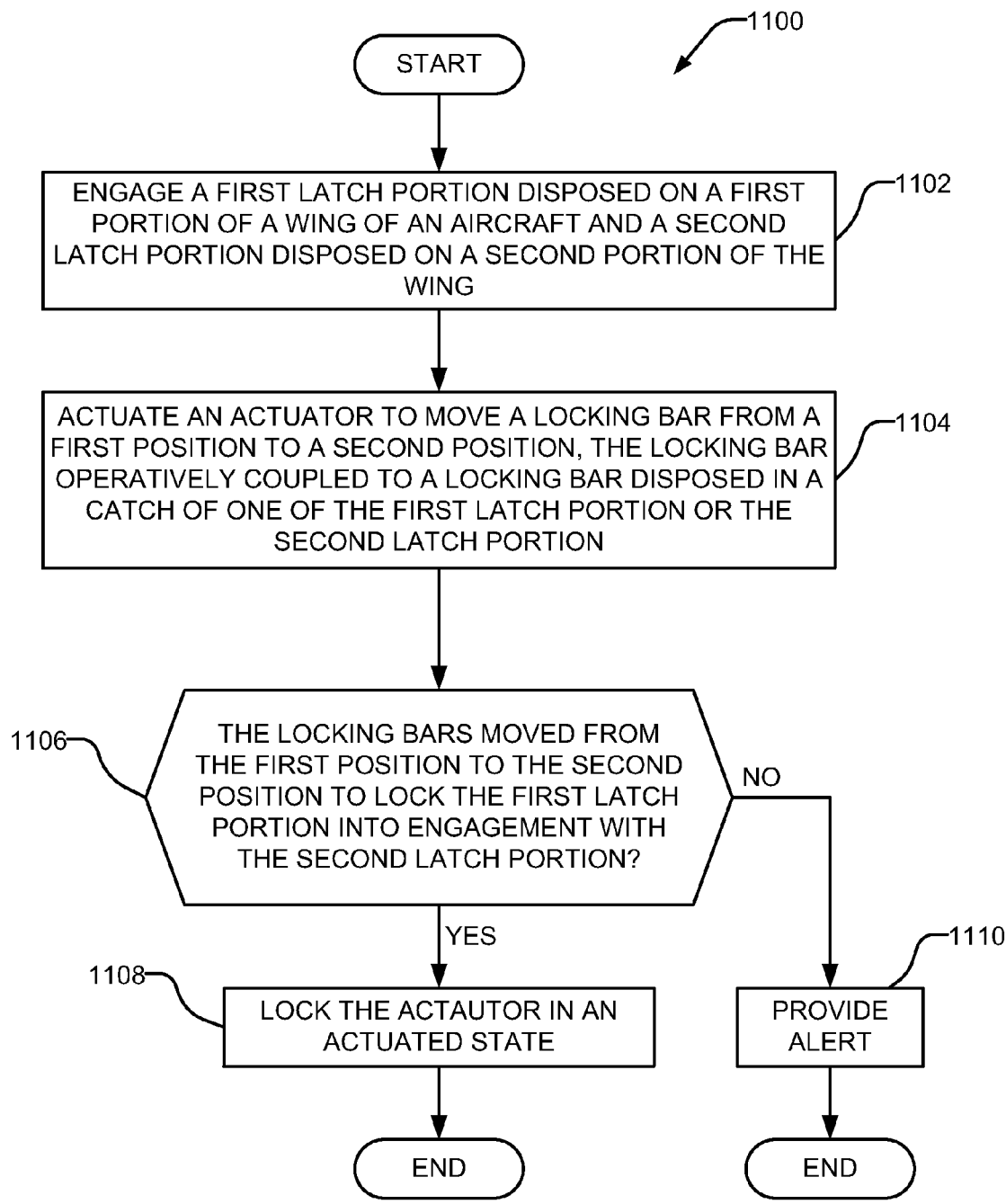
FIG. 11 is a flowchart representative of an example method in accordance with the teachings of this disclosure.
Figure 12:
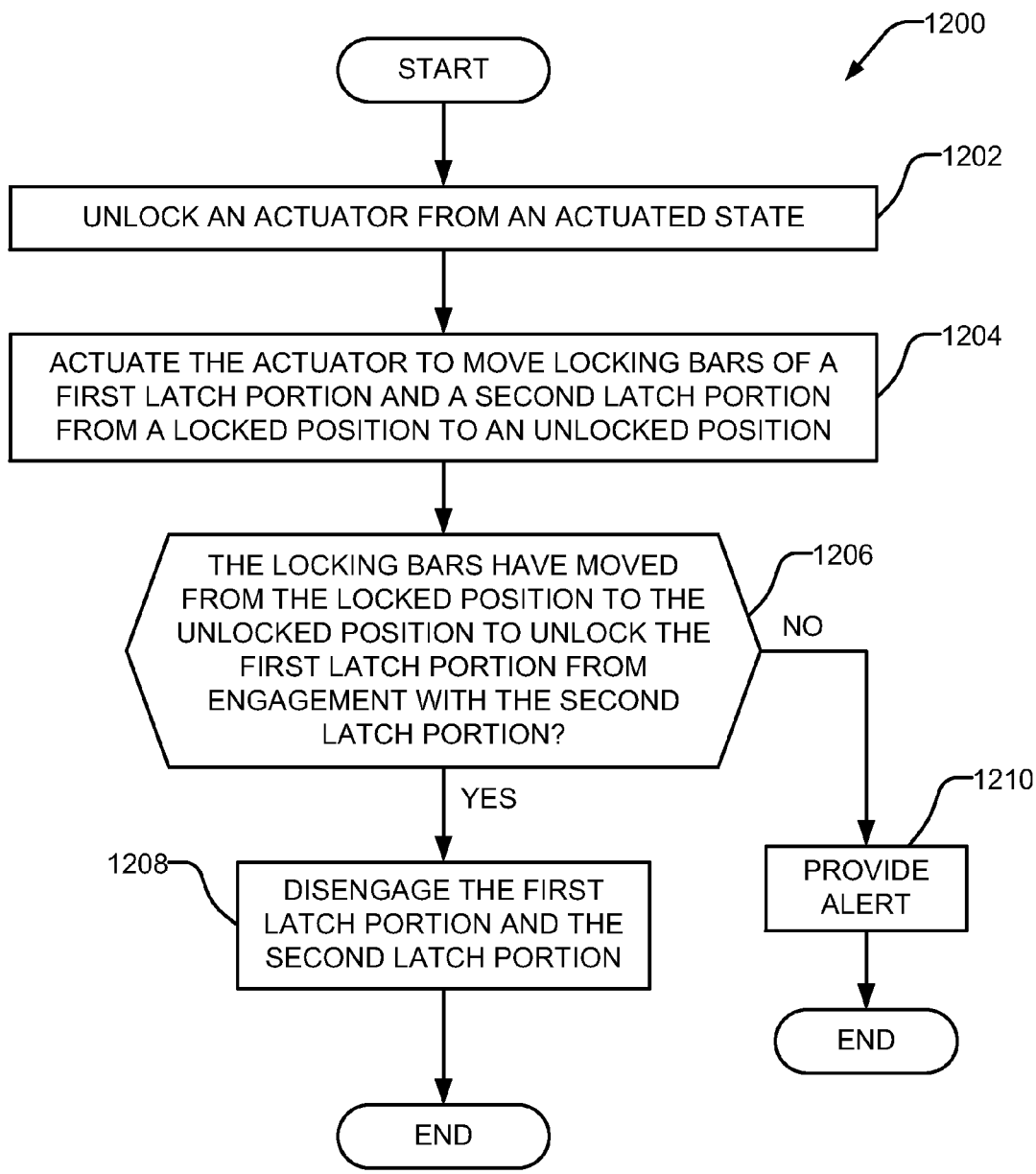
FIG. 12 is a flowchart representative of another example method in accordance with the teachings of this disclosure.

FIGS. 11 and 12 depict example flow diagrams representative of methods or processes that may be implemented using, for example, computer readable instructions. The example processes of FIGS. 11 and 12 may be performed using a processor, a controller and/or any other suitable processing device. For example, the example processes of FIGS. 11 and 12 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIGS. 11 and 12 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 11 and 12 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more operations depicted in FIGS. 11 and 12 may be implemented manually or as any combination(s) of any of the foregoing techniques, for example, any combination of firmware, software, discrete logic and/or hardware.

Further, although the example processes of FIGS. 11 and 12 are described with reference to the flow diagrams of FIGS. 11 and 12, respectively, other methods of implementing the processes of FIGS. 11 and 12 may be employed. For example, the order of execution of the blocks may be changed, and/or some of the blocks described may be changed, eliminated, sub-divided, or combined. Additionally, one or more of the operations depicted in FIGS. 11 and 12 may be performed sequentially and/or in parallel by, for example, separate processing threads, processors, devices, discrete logic, circuits, etc.

FIG. 11 is a flowchart representative of an example method 1100 that can be performed to lock a foldable wing such as, for example, the first wing 102 of FIGS. 1-4 in the spread position. With reference to FIGS. 1-10, the example method of FIG. 11 begins by engaging the first latch portion 404 disposed on the first portion 200 of the first wing 102 of the aircraft 100 and the second latch portion 406 disposed on the second portion 204 of the first wing 102 (block 1102). For example, to engage the first portion 200 of the first wing 102 and the second portion 204 of the first wing 102, the example wing actuator 410 moves the second portion 204 of the first wing 102 from the folded position to the spread position.

In the illustrated example, the first latch portion 404 includes the first catch 502, the second catch 504 and the third catch 506; the second latch portion 406 includes the fifth catch 582 and the sixth catch 584. However, other examples include other numbers of catches. One of the first locking bar 530, the second locking bar 532, the third locking bar 534, the fifth locking bar 568, the sixth locking bar 574 and the seventh locking bar 576 is disposed in each one of the first catch 502, the second catch 504, the third catch 506, the fourth catch 570, the fifth catch 582 and the sixth catch 584. In some examples, each of the first locking bar 530, the second locking bar 532, the third locking bar 534, the sixth locking bar 574 and the seventh locking bar 576 is urged toward the first position (e.g., an unlocked position) via a spring such as, for example, the example spring 910 of FIGS. 9 and 10. When the first latch portion 404 and the second latch portion 406 are engaged, the first locking bar 530, the second locking bar 532, the third locking bar 534, the fourth locking bar 552, the fifth locking bar 568, the sixth locking bar 574 and the seventh locking bar 576 are oriented along the first axis.

At block 1104, the first latch actuator 544 is actuated to move the first locking bar 530, the second locking bar 532, the third locking bar 534, the fourth locking bar 552, the fifth locking bar 568, the sixth locking bar 574 and the seventh locking bar 576 from the first position to the second position (e.g., a locked position). When the first latch actuator 544 is actuated, the fourth locking bar 552 of the first latch actuator 544 moves the first locking bar 530, the second locking bar 532 and the third locking bar 534 of the first latch portion 404 and the sixth locking bar 574 and the seventh locking bar 576 of the second latch portion 406 such that two of the first locking bar 530, the second locking bar 532, the third locking bar 534, the fourth locking bar 552, the fifth locking bar 568, the sixth locking bar 574 and the seventh locking bar 576 are disposed in each one of the first catch 502, the second catch 504, the third catch 506, the fourth catch 570, the fifth catch 582 and the sixth catch 584.

At block 1106, the sensor 572 and/or the control system 578 determines if the first locking bar 530, the second locking bar 532, the third locking bar 534, the fourth locking bar 552, the fifth locking bar 568, the sixth locking bar 574 and the seventh locking bar 576 have moved from the first position to the second position to lock the first latch portion 404 into engagement with the second latch portion 406. For example, when the first latch actuator 544 moves the first locking bar 530, the second locking bar 532, the third locking bar 534, the fourth locking bar 552, the fifth locking bar 568, the sixth locking bar 574 and the seventh locking bar 576, the second latch actuator 560 is back-driven to the unactuated state. In some such examples, based on information (e.g., a position of the fifth locking bar 568 of the second latch actuator 560, etc.) acquired by the sensor 572, the control system 578 determines that the second latch actuator 560 is in the unactuated state and, thus, the first latch portion 404 is locked into engagement with the second latch portion 406. In some examples, the control system 578 determines if the first latch portion 404 and the second latch portion 406 are locked into engagement based on a proximity of the sensor 572 to one or more of the first locking bar 530, the second locking bar 532, the third locking bar 534, the fourth locking bar 552, the fifth locking bar 568, the sixth locking bar 574 and the seventh locking bar 576, a piston of the second latch actuator 560, and/or any other suitable portion of the second latch actuator 560.

If the sensor 572 and/or the control system 578 determine that the first locking bar 530, the second locking bar 532, the third locking bar 534, the fourth locking bar 552, the fifth locking bar 568, the sixth locking bar 574 and the seventh locking bar 576 moved to lock the first latch portion 404 into engagement with the second latch portion 406, the first latch actuator 544 is locked in the actuated state (block 1108). In some examples, the first lock 556 and/or the second lock 558 of the first latch actuator 544 is moved to the locked position to lock the first latch actuator 544 in the actuated state. In such examples, if the first latch actuator 544 is de-energized, the first lock 556 and/or the second lock 558 hold the first latch actuator 544 in the actuated state, and the second portion 204 of the first wing 102 remains locked in the spread position. If the sensor 572 and/or the control system 578 determine that the first locking bar 530, the second locking bar 532, the third locking bar 534, the fourth locking bar 552, the fifth locking bar 568, the sixth locking bar 574 and the seventh locking bar 576 did not move to lock the first latch portion 404 into engagement with the second latch portion 406, an alert is provided (block 1110). For example, the control system 578 generates an alarm (e.g., a noise, a visual indication, etc.), which is displayed in the cockpit.

FIG. 12 is a flowchart representative of another example method 1200 that can be performed to enable the second portion 204 of the first wing 102 to move from the spread position to the folded position. With reference to FIGS. 1-10, the example method of FIG. 12 begins by unlocking the first latch actuator 544 from the actuated state (block 1202). In some examples, the first latch actuator 544 is unlocked from the actuated state by moving the first lock 556 and/or the second lock 558 to the unlocked position. At block 1204, the first latch actuator 544 is actuated to move the first locking bar 530, the second locking bar 532, the third locking bar 534, the fourth locking bar 552, the fifth locking bar 568, the sixth locking bar 574 and the seventh locking bar 576 from a locked position (e.g., the second position) to an unlocked position (e.g., the first position). In some examples, the first latch actuator 544 is actuated by de-energizing the first latch actuator 544 (e.g., by decreasing a hydraulic pressure provided to the first latch actuator 544). In some such examples, the second latch actuator 560, which may be continuously energized, drives the first locking bar 530, the second locking bar 532, the third locking bar 534, the fourth locking bar 552, the fifth locking bar 568, the sixth locking bar 574 and the seventh locking bar 576 to the unlocked position when the first latch actuator 544 is de-energized.

At block 1206, the sensor 572 and/or the control system 578 determine if the first locking bar 530, the second locking bar 532, the third locking bar 534, the fourth locking bar 552, the fifth locking bar 568, the sixth locking bar 574 and the seventh locking bar 576 have moved from the locked position to the unlocked position to unlock the first latch portion 404 from engagement with the second latch portion 406. In some examples, the sensor 572 determines if the first locking bar 530, the second locking bar 532, the third locking bar 534, the fourth locking bar 552, the fifth locking bar 568, the sixth locking bar 574 and the seventh locking bar 576 have moved to the unlocked position based on a proximity of the sensor 572 to one or more of the first locking bar 530, the second locking bar 532, the third locking bar 534, the fourth locking bar 552, the fifth locking bar 568, the sixth locking bar 574 and the seventh locking bar 576, the piston of the second latch actuator 560, and/or any other portion of the second latch actuator 560. In some such examples, if the second latch actuator 560 has moved to the actuated position, then the sensor 572 and/or the control system 578 determine that the first latch portion 404 is unlocked from engagement with the second latch portion 406. If the sensor 572 and/or the control system 578 determines that the first latch portion 404 is unlocked from the second latch portion 406, the first latch portion 404 and the second latch portion 406 are disengaged (block 1208). For example, the wing actuator 410 is actuated to rotate the second portion 204 of the first wing 102 about the joint 400 to move the second portion 204 of the first wing 102 to the folded position. If the sensor 572 and/or the control system 578 determines that the first latch portion 404 is not unlocked (e.g., remains locked) from engagement with the second latch portion 406, an alert is provided. For example, the control system 578 generates and/or displays the alert in the cockpit of the aircraft 100.

Although certain example methods, apparatus and articles of manufacture have been described herein, the scope of coverage of this disclosure is not limited thereto. On the contrary, this disclosure covers all methods, apparatus and articles of manufacture fairly falling within the scope of the claims.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. An apparatus, comprising:
    a first latch portion including a first tooth and a first pin disposed in a first aperture defined by the first tooth;
    a second latch portion including a second tooth and a second pin disposed in a second aperture defined by the second tooth, the second tooth of the second latch portion to mesh with the first tooth of the first latch portion to substantially orient the first pin and the second pin along an axis; and
    an actuator adjacent a first end of one of the first latch portion or the second latch portion to move the first pin and the second pin along the axis to lock the first latch portion to the second latch portion.

2. The apparatus of claim 1, further comprising an actuator adjacent a second end of one of the first latch portion or the second latch portion, the actuator adjacent the second end to be back-driven by one of the first pin or the second pin when the actuator adjacent the first end moves the first pin and the second pin along the axis.

3. The apparatus of claim 1, wherein at least one of the first tooth and the second tooth includes a retainer to retain one of the first pin or the second pin within the first tooth or the second tooth.

4. The apparatus of claim 1, further comprising a sensor to determine if the first latch portion is locked into engagement with the second latch portion.

5. The apparatus of claim 1, wherein the actuator comprises a lock to lock the actuator in an actuated state.

6. The apparatus of claim 1, wherein the actuator is to move the first pin and the second pin a distance less than a distance corresponding to a width of one of the first tooth or the second tooth along the axis.

7. The apparatus of claim 1, wherein the first latch portion is disposed on a first portion of a wing of an aircraft and the second latch portion is disposed on a second portion of the wing that is to move relative to the first portion of the wing.

8. The apparatus of claim 1, wherein at least one of the first tooth and the second tooth defines a chamfer.

* * * * *